United States Patent Office 3,629,437
Patented Dec. 21, 1971

3,629,437
COCCIDIOSTATIC COMPOSITION CONTAINING THIOPHENE-1,1-DIOXIDES
Melvin Harris Rosen, Madison, and Herbert Morton Blatter, Springfield, N.J., assignors to Ciba Corporation, Summit, N.J.
No Drawing. Filed Oct. 8, 1968, Ser. No. 765,974
Int. Cl. A61k 27/00
U.S. Cl. 424—275
3 Claims

ABSTRACT OF THE DISCLOSURE 3-amino-2,4-diaryl-thiophene-1,1-dioxides, e.g. those of the formula

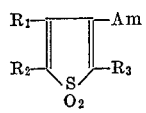

Am=tert. amino
$R_1$=H or alkyl
$R_{2,3}$=iso- or heterocyclic aryl are antiparasitic agents.

SUMMARY OF THE INVENTION

The present invention concerns and has for its object the provision of new 3-amino-2,4-diaryl-thiophene-1,1-dioxides, more particularly of those of the Formula I

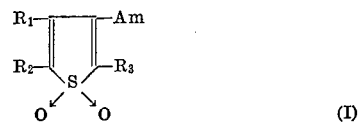

in which Am is a tertiary amino group, $R_1$ is hydrogen or lower alkyl and each of $R_2$ and $R_3$ is an iso- or heterocyclic aryl radical, of corresponding pharmaceutical or veterinary compositions, feedstuffs or additives thereof and of methods for the preparation and application of these products. Said compositions or feedstuffs alone, or in combination with other therapeutic agents, are useful antiparasitic, preferably coccidiostatic agents.

DESCRIPTION OF THE PREFERRED EMBODIMENTS

The tertiary amino group Am represents preferably di-lower alkylamino, e.g. dimethylamino, N-methyl-N-ethylamino, diethylamino, di-n-propylamino, di-isopropylamino or di-n-butylamino, but also, for example, lower alkyleneimino or monooxa-, monothia- or monoazo-lower alkyleneimino, e.g. ethyleneimino, pyrrolidino, 2-methyl-pyrrolidino, piperidino, 2- or 4-methyl-piperidino, 1,6- or 2,5-hexamethyleneimino, 1,7- or 2,6-heptamethyleneimino; morpholino, 3-methyl-morpholino or thiamorpholino; piperazino, 4-(methyl, ethyl, n-propyl or i-propyl)-piperazino, 3-(methyl, ethyl or n-propyl)-3-aza-1,5- or 1,6-hexyleneimino or 4-methyl-4-aza-1,7- or 2,6-heptyleneimino. In the above amino groups two heteroatoms are separated by at least 2 carbon atoms, and the term "lower" referred to above and hereinafter in connection with organic radicals or compounds respectively, defines such with up to 7, preferably up to 4, carbon atoms.

A lower alkyl group $R_1$ is preferably methyl, but also, for example, ethyl, n- or i-propyl, -butyl, -pentyl, -hexyl or -heptyl.

The iso or heterocyclic aryl radicals $R_2$ and $R_3$ represent preferably monocyclic isocyclic or monooxa-, monothia- or monoazacyclic aryl radicals, which are unsubstituted or substituted by one or more than one, preferably by 1 or 2, of the same or of different substituents, for example, by lower alkyl, such as methyl, ethyl, n- or i-propyl or -butyl, free, etherified or esterified hydroxy or mercapto groups, such as lower alkoxy or alkylmercapto, e.g. methoxy, ethoxy, n- or i-propoxy or -butoxy, halogeno, e.g. fluoro, chloro or bromo, trifluoromethyl, nitro or amino, especially di-lower alkylamino, e.g. dimethylamino or diethylamino. Preferred aryl radicals are phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, furyl, (lower alkyl)-furyl, thienyl, (lower alkyl)-thienyl, pyridyl or (lower alkyl)-pyridyl.

The compounds of the invention exhibit valuable pharmacological properties. Apart from antibacterial and growth promoting effects, they show a marked activity against parasites causing coccidiosis, such as Eimeria tenella, acervulina, adenoides, agridis, brunetti, hagani, maxima and necatrix. This can be demonstrated, for example, in invitro or in vivo tests, using advantageously mammals or birds, e.g. mice or chickens, as test objects. The coccidiostatic activity of the compounds of this invention can be estimated, for example, by the prophylactic or curative effect of a standard feed containing between about 0.0001 and about 0.1%, preferably between about 0.01 to about 0.05% of said active compounds, fed to chickens 1 to 2 days prior or after their inoculation with sporulated oocysts of said Eimeria strains. Besides the above-mentioned utility, the compounds of this invention are also useful intermediates in the manufacture of other valuable products, particularly of pharmacologically active compounds.

Valuable compounds are those of Formula I, in which Am is di-lower alkylamino, lower alkyleneimino or mono-oxa-, monothia- or monoazo-lower alkyleneimino wherein 2 heteroatoms are separated by at least 2 carbon atoms, $R_1$ is hydrogen or lower alkyl, and each of $R_2$ and $R_3$ is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, furyl, (lower alkyl)-furyl, thienyl, (lower alkyl)-thienyl, pyridyl or (lower alkyl)-pyridyl.

Particularly useful are compounds of Formula II

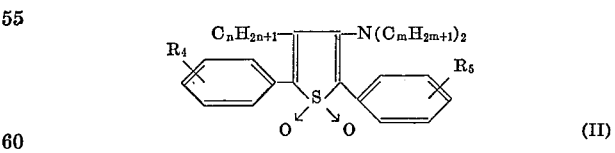

in which each of $m$ and $n$ is an integer from 1 to 4 and each of $R_4$ and $R_5$ is hydrogen or halogen.

Especially valuable are the compounds of Formula II, in which each of $m$ and $n$ is the integer 1 or 2, and each of $R_4$ and $R_5$ is hydrogen or chlorine.

The compounds of the invention are either prepared according to the methods known for the preparation of thiophene-1,1-dioxides or advantageously according to the new method comprising the addition of lower alkynyl-amines to 2,3-diaryl-thiirene-1,1-dioxides, which may be depicted as follows:

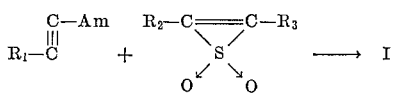

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of reactive derivatives or salts thereof. Mainly, those starting materials should be used in the process of the invention that lead to the formation of those compounds indicated above as being specially valuable.

The starting material used is known or, if new, may be prepared according to known methods, e.g. those described in Angew. Chem. 1967, p. 767 or J. Am. Chem. Soc. 87, 5804 (1965).

The compounds of the invention can be used, for example, in the form of pharmaceutical or veterinary compositions, animal feedstuffs or additives to feedstuffs, which are a further object of the present invention. The former contain said compounds in conjunction or admixture with inorganic or organic, solid or liquid pharaceutical excipients suitable especially for enteral administration. Suitable excipients are substances that do not react with the compounds of the invention, for example, water, gelatine, gums, sugars, e.g. lactose, glucose or sucrose, starches, e.g. corn starch or arrowroot, stearic acid or salts thereof, e.g. magnesium or calcium stearate, talc, alcohols, e.g. stearyl or benzyl alcohol, propylene glycol or polyalkylene glycols, alginic acid and other known medicinal excipients. The compositions may be, for example, tablets or pills, e.g. micropills, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They are prepared by conventional methods and contain about 0.1 to 75%, more particularly, 1 to 50%, of the active ingredient.

The feedstuffs and additives for feedstuffs or for the drinking water contain the compounds of the invention together with conventional extenders, diluents and/or nutrients, such as sucrose, glucose, molasses, fermentation residues, cornmeal, ground and rolled oats, wheat shorts and middlings, meat scrap, oil cake, soybean and fish meal, alfalfa, clover, grass clippings and the like, mineral supplements, such as bone meal, calcium carbonate, iodized salt and the like, vitamins, such as vitamins A, B, C and D, and other suitable substances, such as preservants, e.g. benzoic acid. They contain the compounds of the invention in an amount ranging between about 0.0001 and 0.1%, preferably between about 0.01 and 0.05%, whereas the additives may contain the pure substances, when used, for example, for the drinking water, but usually contain between about 1 and 75%, preferably 1 and 50%, thereof. The amount of the compounds of the invention administered via the veterinary compositions or the drinking water corresponds to that given with the medicated feedstuffs shown above. The veterinary compositions, feedstuffs and additives may contain one or more than one of other therapeutically valuable substances, for example, sulfonamides, especially N'-(6-chloro-2-pyrazinyl)-sulfonilamide, or N'-(2-quinoxalinyl)-sulfanilamide, but also N'-(2,6-dimethoxy-4-pyrimidyl)-sulfanilamide, N' - (5-ethyl-1,3,4-thiadiazol-2-yl)-sulfanilamide, N'-(5-methyl-3-isoxazolyl)-sulfanilamide, N'-(6-methoxy-3-pyridazinyl)-sulfanilamide and the N'-acetyl derivative thereof, N'-(4-methyl-2-pyrimidinyl)-sulfanilamide, N'-(2,6-dimethyl-4-pyrimidinyl)-sulfanilamide, N'-(5-methyl-1,3,4-thiadiazol-2-yl)-sulfanilamide, N'-(6-chloro-3-pyridazinyl)-sulfanilamide and the sodium salt thereof, N'-(2-phenyl-3-pyrazolyl)-sulfanilamide, N'-(2-phenyl-5-methyl-3-pyrazolyl)-sulfanilamide and the like, arsenic derivatives, e.g. 3-nitro-4-hydroxyphenyl-arsonic acid or arsanilic acid, antibiotics, such as penicillin, e.g. procaine penicillin, streptomycin, aureomycin, terramycin, tetracyclines, e.g. oxytertracycline, or chlortetracycline, bacitracines, e.g. zinc or manganese bactiracin or bacitracin methylene disalicylate, antiparasitic agents, e.g. methyl-4-acetamino-2-ethoxy-benzoate, 2 - amino-5-nitrothiazole, 1-(5-nitrothiazolyl-2)-2-oxo-tetrahydroimidazole, 6,7-dialkoxy-4-hydroxy-3-quinolinecarboxylic acids or their lower alkyl esters and/or tranquiizers, such as reserpine, methyl 18-epi-O-methyl-reserpate, meprobamate and the like, and/or a compound of U.S. Pat. No. 3,385,857.

The following examples are intended to illustrate the invention and are not to be construed as being limitations thereon. Temperatures are given in degrees Centigrade, and all parts wherever given are parts by weight.

EXAMPLE 1

To the mixture of 10.0 g. 2,3-diphenylthiirene-1,1-dioxide and 50 ml. benzene, the solution of 5.0 g. diethylpropynylamine in 15 ml. benzene is added during 5 minutes while stirring and keeping the temperature at about 10°. Hereupon the temperature is allowed to rise to about 75° and the mixture is stirred overnight at room temperature. It is evaporated in vacuo, the residue triturated with diethyl ether-hexane, the crystals formed in the cold filtered off and recrystallized from diethyl ether, to yield the 3 - diethylamino-2,5-diphenyl-4-methyl-thiophene-1,1-dioxide of the formula

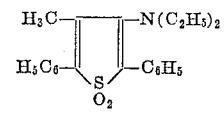

melting at 108–110°.

EXAMPLE 2

Feed additive containing 15% of the active ingredient.

| Formula: | Kg. |
|---|---|
| 3 - diethylamino - 2,5 - diphenyl - 4 - methyl-thiophene-1,1-dioxide | 150 |
| Soybean lecithin | 10 |
| Soybean oil | 10 |
| Corn gluten feed | 830 |

Procedure

The corn gluten feed is ground in a mill and passed through a sieve with 0.85 mm. openings. 150 kg. thereof is mixed with the active ingredient and the premix obtained passed through a sieve with 0.85 mm. openings. The lecithin and oil are mixed and added to the remainder corn gluten feed, followed by the premix and the whole is blended and mixed for at least 20 minutes.

We claim:
1. A veterniary composition for birds, comprising a coccidiostatic amount of a compound having the formula

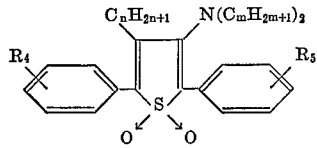

in which each of $m$ and $n$ is an integer from 1 to 4 and each of $R_4$ and $R_5$ is hydrogen, together with an inert carrier suitable for enteral application.

2. A composition as claimed in claim 1, comprising 0.0001 to 0.1% of the coccidiostatic compound in a conventional chicken feedstuff.

3. A composition as claimed in claim 1, comprising 1 to 75% of the coccidiostatic compound in a conventional additive for a chicken feedstuff.

References Cited

UNITED STATES PATENTS

| | | | |
|---|---|---|---|
| 2,976,297 | 3/1961 | Bluestone | 424—275 |
| 3,073,691 | 1/1963 | Bluestone | 424—275 |
| 3,098,793 | 7/1963 | Loev | 424—275 |
| 3,197,482 | 7/1965 | Faith | 424—275 |
| 3,213,109 | 10/1965 | Faith | 424—275 |

JEROME D. GOLDBERG, Primary Examiner

U.S. Cl. X.R.

424—246, 248, 250, 267, 274; 260—243 B, 247.1, 268 FT, 293.4 E, 294.8 D, 326.8